(12) United States Patent
Shih et al.

(10) Patent No.: US 7,369,727 B2
(45) Date of Patent: May 6, 2008

(54) APPARATUS FOR COUPLING ELECTROMAGNETIC ENERGY AND METHOD OF MAKING

(75) Inventors: Min-Yi Shih, Niskayuna, NY (US); Kelvin Ma, Clifton Park, NY (US); Matthew Christian Nielsen, Schenectady, NY (US); Samhita Dasgupta, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 146 days.

(21) Appl. No.: 11/131,450

(22) Filed: May 16, 2005

(65) Prior Publication Data
US 2005/0249453 A1 Nov. 10, 2005

Related U.S. Application Data

(62) Division of application No. 10/452,554, filed on May 30, 2003, now abandoned.

(51) Int. Cl.
*G02B 6/26* (2006.01)

(52) U.S. Cl. ............................. 385/43; 385/31; 385/28; 385/129

(58) Field of Classification Search ...................... None
See application file for complete search history.

(56) References Cited

U.S. PATENT DOCUMENTS

| 5,187,461 A | 2/1993 | Brommer et al. |
| 5,526,449 A | 6/1996 | Meade et al. |
| 5,802,236 A | 9/1998 | Digiovanni et al. |
| 5,838,870 A | 11/1998 | Soref |
| 5,889,898 A * | 3/1999 | Koren et al. ................... 385/9 |
| 5,937,118 A | 8/1999 | Komori |
| 5,999,308 A | 12/1999 | Nelson et al. |
| 6,064,506 A | 5/2000 | Koops |
| 6,075,640 A | 6/2000 | Nelson |
| 6,097,870 A | 8/2000 | Ranka et al. |
| 6,175,671 B1 | 1/2001 | Roberts |
| 6,188,819 B1 | 2/2001 | Rosaka et al. |
| 6,430,341 B1 | 8/2002 | Russell et al. |
| 6,980,720 B2 * | 12/2005 | Gothoskar et al. ............ 385/43 |
| 2003/0068152 A1 * | 4/2003 | Gunn, III ................... 385/129 |
| 2003/0202764 A1 | 10/2003 | Lee et al. |
| 2004/0202440 A1 | 10/2004 | Gothoskar et al. |

OTHER PUBLICATIONS

A. Adibi, et al., "Properties of teh Slab Modes in Photonic Cyrstal Optical Waveguides," Journal of Lightwave Technology, vol. 8, No. 11, Nov. 2000, pp. 1554-1564.
A. Mekis, eta l., "Tapered Couples of Efficient Interfacing Between Dielectric and Photonic Cyrstal Waveguides," Journal of Lightwave Technology, vol. 19, Jun. 2001, pp. 861-865.
M. Palamaru, "Photonic Crystal Waveguides: Out-of-Plane Losses and Adiabatic Modal Conversion," Applied Physics Letters, vol. 78, No. 11, Mar. 2001, pp. 1466-1468.

* cited by examiner

*Primary Examiner*—Fayez G. Assaf
(74) *Attorney, Agent, or Firm*—Fletcher Yoder

(57) ABSTRACT

An electromagnetic coupler comprising: a coupling waveguide adapted for receiving input modes along an input axis, propagating coupling modes along a coupling axis, and transmitting output modes along an output axis, the output axis being not parallel to the coupling axis; and an output waveguide disposed adjacent the coupling waveguide and adapted for receiving the output modes.

37 Claims, 2 Drawing Sheets

APPARATUS FOR COUPLING ELECTROMAGNETIC ENERGY AND METHOD OF MAKING

This application is a divisional of application Ser. No. 10/452,554, filed May 30, 2003, now abandoned and entitled "APPARATUS FOR COUPLING ELECTROMAGNETIC ENERGY AND METHOD FOR MAKING".

BACKGROUND

The present invention relates generally to the field of electromagnetic systems and more specifically to the field of coupling electromagnetic energy between waveguides.

In a wide variety of applications, photonic band gap (PBG) waveguides are used in combination with conventional dielectric waveguides and conventional optical fiber to form integrated optical circuits. However, conventional geometries used for electromagnetically coupling PBG waveguides with these conventional materials produce junctions where, because of optical mode mismatch, reflection and scattering dissipate a significant fraction of the optical power.

Opportunities exist, therefore, to reduce the power requirements of integrated optical circuits by designing new coupling geometries providing a higher efficiency junction.

SUMMARY

The opportunities described above are addressed, in one embodiment of the present invention, by an electromagnetic coupler comprising: a coupling waveguide adapted for receiving input modes along an input axis, propagating coupling modes along a coupling axis, and transmitting output modes along an output axis, the output axis being not parallel to the coupling axis; and an output waveguide disposed adjacent the coupling waveguide and adapted for receiving the output modes.

In addition to apparatus embodiments, method embodiments of the present invention include, without limitation, a method of making an electromagnetic coupler, the method comprising the acts of: providing a coupling waveguide adapted for receiving input modes along an input axis, propagating coupling modes along a coupling axis, and transmitting output modes along an output axis, the output axis being not parallel to the coupling axis; and disposing an output waveguide adjacent the coupling waveguide so as to receive the output modes.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
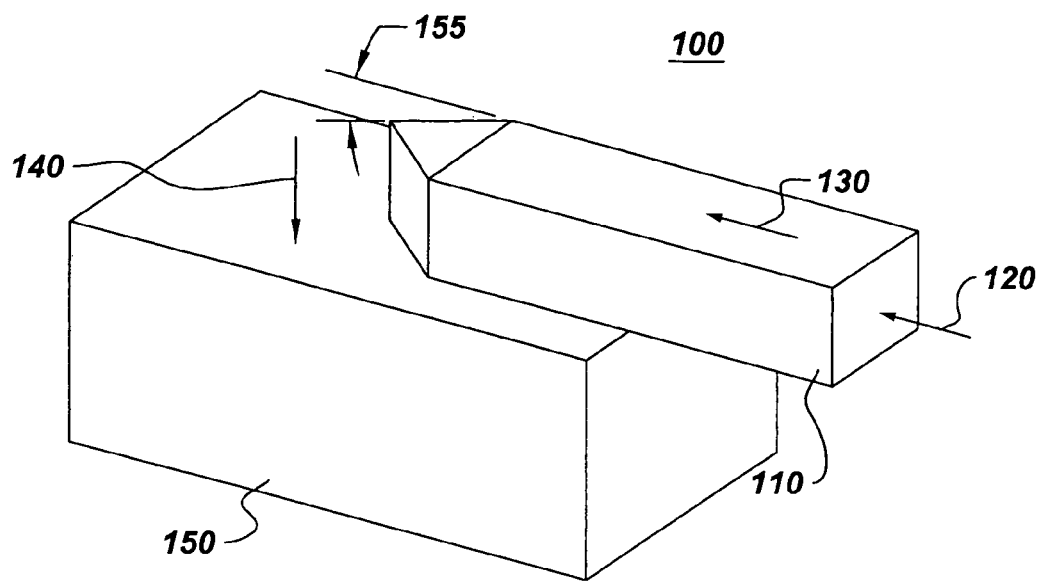
FIG. 1 is an isometric drawing illustrating an electromagnetic coupler in accordance with one embodiment of the present invention.

In accordance with an embodiment of the present invention, FIG. 1 is an isometric drawing illustrating an electromagnetic coupler 100 comprising a coupling waveguide 110 and an output waveguide 150. In operation, coupling waveguide 110 receives input modes along an input axis 120, propagates coupling modes along a coupling axis 130, and transmits output modes along an output axis 140. In conventional coupling geometries, output axis 140 is parallel to coupling axis 130. In contrast, in the embodiment of FIG. 1, output axis 140 is not parallel to coupling axis 130. Output waveguide 150 is disposed adjacent coupling waveguide 110 to receive the output modes. In general, coupling waveguide 110 and output waveguide 150 comprise any materials capable of guiding energy at a desired wavelength including, by way of example but not limitation, conventional waveguide materials and PBG materials.

FIG. 1 illustrates a particular embodiment of the present invention wherein at least one end of coupling waveguide 110 is tapered. This taper provides matching of a variety of modes along the length of coupling waveguide 110 so that efficient coupling occurs where the mode of coupling waveguide 110 best complements the mode of output waveguide 150. In other words, optical energy from coupling waveguide 110 is tailored and injected into output waveguide 150.

In a more particular embodiment in accordance with the embodiment of FIG. 1, coupling waveguide 110 has a widthwise taper with a taper angle 155 in a range from about 5 degrees to about 10 degrees. Taper angle 155 is defined as an acute dihedral angle formed between a plane tangent to a tapering portion of coupling waveguide 110 and a plane tangent to a non-tapering portion. As used herein, "widthwise taper" refers to a variation in the dimension of coupling waveguide 110 measured along an axis orthogonal to both coupling axis 130 and output axis 140.

In a more particular embodiment in accordance with the embodiment of FIG. 1, at least one of coupling waveguide 110 and output waveguide 150 comprises a photonic band gap material.

Figure 2:
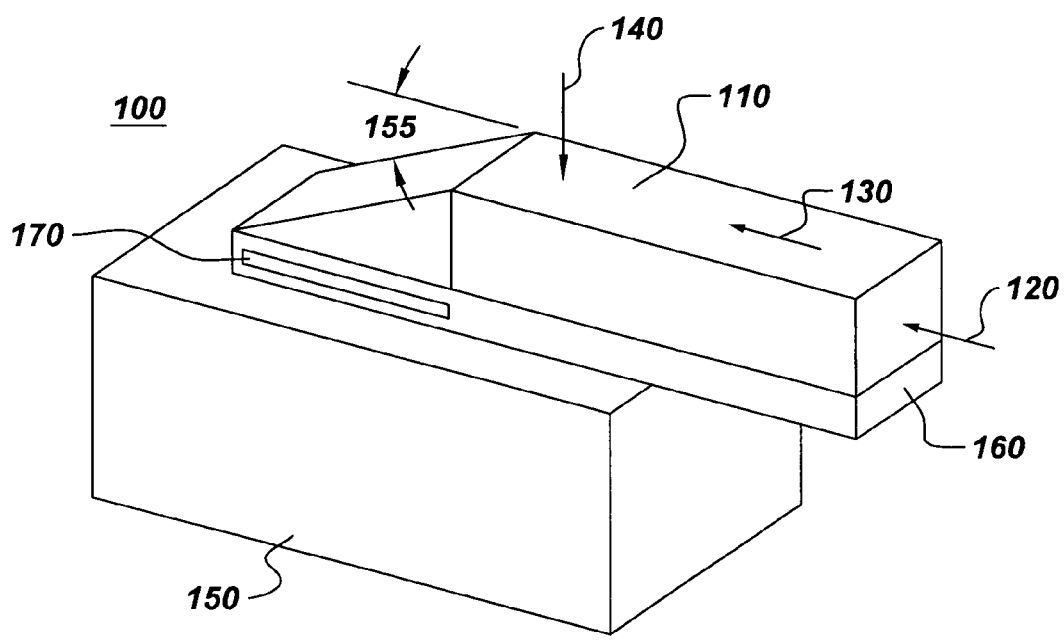
FIG. 2 is an isometric drawing illustrating an electromagnetic coupler in accordance with another embodiment of the present invention.

In accordance with another embodiment of the present invention, FIG. 2 is an isometric drawing wherein coupling waveguide 110 further comprises an active layer 160 disposed adjacent output waveguide 150. Active layer 160 provides a means for using electromagnetic coupler 100 as an active optical modulator. Depending on the properties (also called "effects") exhibited by the material chosen, various actuation means are available for modulating the optical properties of active layer 160. Such actuation means include, without limitation, electric fields (electro-optic effect), optical fields (Kerr effect), heat flux (thermo-optic effect), and acoustic waves (acousto-optic effect). Candidate materials for active layer 160 include, without limitation, polymers, liquid crystals, semiconductors, and optical crystals such as, for example, lithium niobate. In other embodiments in accordance with the embodiment of FIG. 2, the material of active layer 160 promotes lasing in coupling waveguide 110.

In a more particular embodiment in accordance with the embodiment of FIG. 2, active layer 160 comprises at least one quantum well 170. In some embodiments quantum well 170 is a multilayer quantum well. Such a multi-layer quantum well can be utilized as an electro-optical absorber or modulator.

The taper shown in FIG. 2 is a heightwise taper. As used herein, "heightwise taper" refers to a variation in the dimension of coupling waveguide 110 measured along output axis 140. In another more particular embodiment in accordance with the embodiment of FIG. 2, coupling waveguide 110 has heightwise taper with a taper angle 155 of about 45 degrees.

Figure 3:
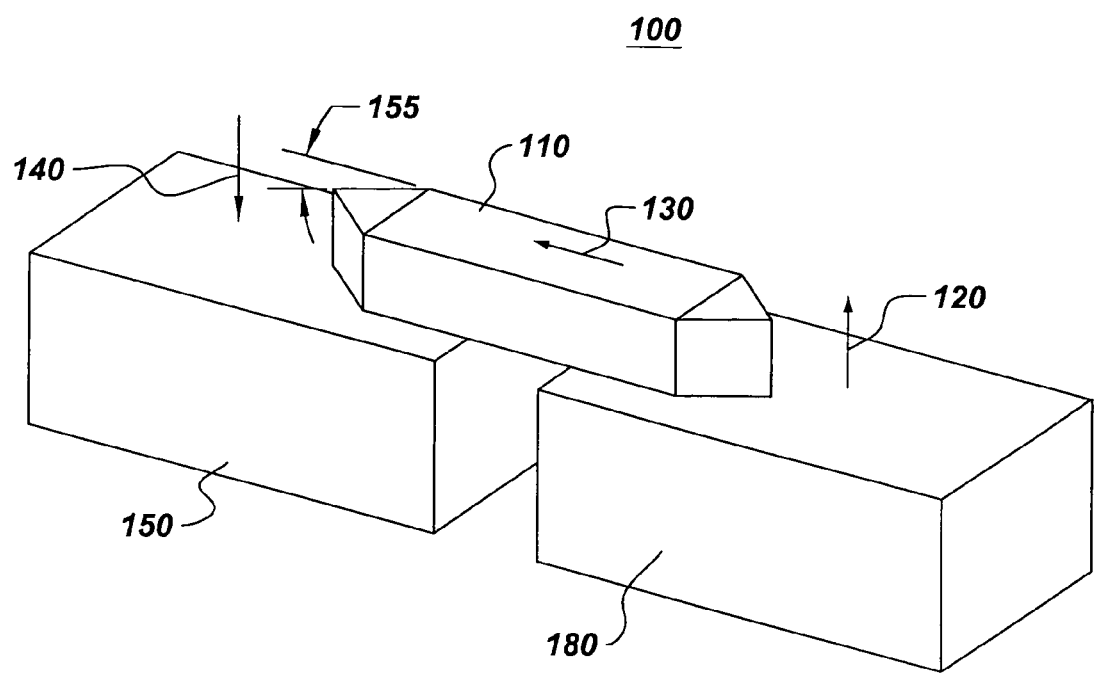
FIG. 3 is an isometric drawing illustrating an electromagnetic coupler in accordance with a more detailed embodiment of the embodiment of FIG. 1.

In accordance with a more detailed embodiment of the embodiment of FIG. 1, FIG. 3 is an isometric drawing wherein electromagnetic coupler 100 further comprises an input waveguide 180 disposed adjacent coupling waveguide 110. In operation, input waveguide 180 transmits the input modes along input axis 120 where input axis 120 is not parallel to coupling axis 130. In a more particular embodiment in accordance with the embodiment of FIG. 3, at least one of input waveguide 180, coupling waveguide 110, and output waveguide 150 comprises a photonic band gap material. Input waveguide 180 can either be a conventional optical waveguide or a PBG waveguide.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electromagnetic coupler comprising:
   a coupling waveguide adapted for receiving input modes along an input axis, propagating coupling modes along a coupling axis, and transmitting output modes along an output axis, said output axis being to not in-plane with said coupling axis;
   an output waveguide disposed adjacent said coupling waveguide and adapted for receiving said output modes, and
   an active layer disposed adjacent said output waveguide.

2. The coupler of claim 1 wherein at least one of said coupling waveguide and said output waveguide comprises a photonic band gap material.

3. The coupler of claim 1 wherein at least one end of said coupling waveguide is tapered.

4. The coupler of claim 3 wherein at least one end of said coupling waveguide has a widthwise taper.

5. The coupler of claim 4 wherein said coupling waveguide has a taper angle in a range from about 5 degrees to about 10 degrees.

6. The coupler of claim 3 wherein said at least one end of said coupling waveguide has a heightwise taper.

7. The coupler of claim 6 wherein said coupling waveguide has a taper angle of about 45 degrees.

8. The coupler of claim 1 wherein said active layer comprises at least one quantum well.

9. The coupler of claim 8 wherein said quantum well comprises a multilayer quantum well.

10. The coupler of claim 1 wherein said active layer comprises a material exhibiting at least one effect selected from the group consisting of the electro-optic effect, Kerr effect, thermo-optic effect, and acousto-optic effect.

11. The coupler of claim 1 wherein said active layer comprises a material adapted for promoting lasing in coupling waveguide.

12. The coupler of claim 1 further comprising an input waveguide disposed adjacent said coupling waveguide and adapted for transmitting said input modes along said input axis, said input axis being not parallel to said coupling axis.

13. The coupler of claim 12 wherein at least one of said input waveguide, said coupling waveguide, and said output waveguide comprises a photonic band gap material.

14. The coupler of claim 1, wherein the coupler is configured as an active optical modulator and wherein the optical properties of the active layer are modulatable by an actuation means.

15. An electromagnetic coupler comprising:
    a coupling waveguide adapted for receiving input modes along an input axis, propagating coupling modes along a coupling axis, and transmitting output modes along an output axis, said output axis being not in-plane with said coupling axis;
    an output waveguide disposed adjacent said coupling waveguide and adapted for receiving said output modes; and
    an active layer disposed adjacent said output waveguide;
    at least one of said coupling waveguide and said output waveguide comprising a photonic band gap material,
    at least one end of said coupling waveguide being tapered.

16. The coupler of claim 15 wherein said at least one end of said coupling waveguide has a heightwise taper.

17. The coupler of claim 15 wherein said at least one end of said coupling waveguide has a widthwise taper.

18. The coupler of claim 15 wherein said active layer comprises at least one quantum well.

19. The coupler of claim 15 wherein said active layer comprises a material exhibiting at least one effect selected from the group consisting of the electro-optic effect, Kerr effect, thermo-optic effect, and acousto-optic effect.

20. The coupler of claim 15 wherein said active layer comprises a material adapted for promoting lasing in coupling waveguide.

21. The coupler of claim 15 further comprising an input waveguide disposed adjacent said coupling waveguide and adapted for transmitting said input modes along said input axis, said input axis being not parallel to said coupling axis.

22. The coupler of claim 15, wherein the coupler is configured as an active optical modulator and wherein the optical properties of the active layer are modulatable by an actuation means.

23. A method of making an electromagnetic coupler comprising the acts of:
    providing a coupling waveguide adapted for receiving input modes along an input axis, propagating coupling modes along a coupling axis, and transmitting output modes along an output axis, said output axis being not in-plane with said coupling axis;
    disposing an output waveguide adjacent said coupling waveguide so as to receive said output modes; and
    disposing an active layer adjacent said output waveguide.

24. The method of claim 23 wherein at least one of said coupling waveguide and said output waveguide comprises a photonic band gap material.

25. The method of claim 23 further comprising tapering at least one end of said coupling waveguide.

26. The method of claim 25 wherein said act of tapering at least one end of said coupling waveguide comprises producing a heightwise taper.

27. The method of claim 25 wherein said act of tapering at least one end of said coupling waveguide comprises producing a widthwise taper.

28. The method of claim 23 wherein said active layer comprises at least one quantum well.

29. The method of claim 28 wherein said quantum well comprises a multilayer quantum well.

30. The method of claim 23 wherein said active layer comprises a material exhibiting at least one effect selected from the group consisting of the electro-optic effect, Kerr effect, thermo-optic effect, and acousto-optic effect.

31. The method of claim 23 wherein said active layer comprises a material adapted for promoting leasing in coupling waveguide.

32. The method of claim 23 further comprising disposing an input waveguide adjacent said coupling waveguide, said input waveguide being adapted for transmitting said input modes along said input axis, said input axis being not parallel to said coupling axis.

33. The method of claim 32 wherein at least one of said input waveguide, said coupling waveguide, and said output waveguide comprises a photonic band gap material.

34. The method of claim 23, wherein the coupler is configured as an active optical modulator and wherein the optical properties of the active layer are modulatable by an actuation means.

35. A method of making an electromagnetic coupler comprising the acts of:

providing a coupling waveguide adapted for receiving input modes along an input axis, propagating coupling modes along a coupling axis, and transmitting output modes along an output axis, said output axis being not in-plane with said coupling axis;

disposing an output waveguide adjacent said coupling waveguide so as to receive said output modes;

disposing an active layer disposed adjacent said output waveguide; and tapering at least one end of said coupling waveguide, at least one of said coupling waveguide and said output waveguide comprising a photonic band gap material.

36. The method of claim 35 further comprising disposing an input waveguide adjacent said coupling waveguide, said input waveguide being adapted for transmitting said input modes along said input axis, said input axis being not parallel to said coupling axis.

37. The method of claim 35, wherein the coupler is configured as an active optical modulator and wherein the optical properties of the active layer are modulatable by an actuation means.

* * * * *